(12) United States Patent
Weickel et al.

(10) Patent No.: US 11,761,462 B2
(45) Date of Patent: Sep. 19, 2023

(54) VALVE DEVICE AND METHOD FOR ANTICIPATING FAILURE IN A SOLENOID VALVE ASSEMBLY IN A MANIFOLD ASSEMBLY

(71) Applicant: Asco, L.P., Novi, MI (US)

(72) Inventors: Scott Allen Weickel, Highland, MI (US); Enrico De Carolis, Oakland Township, MI (US); Thiago Caetano Ferreira, Versailles (FR); Pascal Moreau, Le Coudray (FR)

(73) Assignee: Asco, L. P.

( * ) Notice: Subject to any disclaimer, the term of this patent is extended or adjusted under 35 U.S.C. 154(b) by 931 days.

(21) Appl. No.: 16/492,512

(22) PCT Filed: Mar. 7, 2017

(86) PCT No.: PCT/US2017/021088
§ 371 (c)(1),
(2) Date: Sep. 9, 2019

(87) PCT Pub. No.: WO2018/164669
PCT Pub. Date: Sep. 13, 2018

(65) Prior Publication Data
US 2021/0131459 A1 May 6, 2021

(51) Int. Cl.
*F15B 13/08* (2006.01)
*F15B 19/00* (2006.01)
(Continued)

(52) U.S. Cl.
CPC ........ *F15B 13/0817* (2013.01); *F15B 19/005* (2013.01); *F15B 20/005* (2013.01);
(Continued)

(58) Field of Classification Search
CPC .............. F15B 13/0817; F15B 13/0889; F15B 13/0882; F15B 13/086; F15B 13/0853;
(Continued)

(56) References Cited

U.S. PATENT DOCUMENTS

| 4,542,649 A | 9/1985 | Charbonneau et al. |
| 5,524,484 A | 6/1996 | Sullivan |

(Continued)

FOREIGN PATENT DOCUMENTS

| CN | 1759252 A | 4/2006 |
| CN | 1914573 A | 2/2007 |

(Continued)

OTHER PUBLICATIONS

Canadian Office Action, CA Application No. 3,057,060, Owner: Asco, LP., Title: A Device and Method for Anticipating Failure in a Solenoid Valve for a Manifold Assembly, dated Aug. 17, 2021.
(Continued)

*Primary Examiner* — Atif H Chaudry
(74) *Attorney, Agent, or Firm* — Reising Ethington P.C.

(57) ABSTRACT

A solenoid valve assembly has a valve body in which a spool is slidably mounted and operated by a solenoid having a coil. A manifold member has a plurality of flow paths for supplying and discharging pressurized fluid to and from ports of the solenoid valve assembly. An intermediate block is interposed between the valve body and the manifold member. The intermediate block has a plurality of through holes for connecting ports of the manifold member to ports on the valve body. At least one sensor is housed in the intermediate block for sensing at least one of pressure and flow in at least one of the through holes.

10 Claims, 5 Drawing Sheets

(51) Int. Cl.
*F15B 20/00* (2006.01)
*F16K 31/42* (2006.01)
*F16K 37/00* (2006.01)
*G01M 3/24* (2006.01)
*G01M 3/28* (2006.01)

(52) U.S. Cl.
CPC .......... *F16K 31/426* (2013.01); *F16K 37/005* (2013.01); *F16K 37/0033* (2013.01); *F16K 37/0041* (2013.01); *F16K 37/0083* (2013.01); *F16K 37/0091* (2013.01); *G01M 3/24* (2013.01); *G01M 3/2876* (2013.01); *F15B 2211/632* (2013.01); *F15B 2211/634* (2013.01); *F15B 2211/6313* (2013.01); *F15B 2211/8636* (2013.01)

(58) Field of Classification Search
CPC .............. F15B 19/005; F15B 20/005; Y10T 137/87885; F16K 27/003; F16K 37/0041; F16K 37/0083; F16K 37/005
See application file for complete search history.

(56) References Cited

U.S. PATENT DOCUMENTS

| | | | |
|---|---|---|---|
| 6,073,650 A | 6/2000 | Garrigues et al. | |
| 6,164,323 A | 12/2000 | Smith et al. | |
| 6,382,737 B1 * | 5/2002 | Isono | B60T 13/163 303/114.1 |
| 6,386,229 B1 | 5/2002 | Morikawa et al. | |
| 6,505,642 B2 | 1/2003 | Miyazoe et al. | |
| 6,520,202 B2 | 2/2003 | Miyazoe et al. | |
| 6,591,865 B2 | 7/2003 | Misumi | |
| 6,612,332 B2 | 9/2003 | Miyazoe et al. | |
| 6,675,830 B2 | 1/2004 | Doi et al. | |
| 6,840,273 B2 | 1/2005 | Miyazoe et al. | |
| 6,913,037 B2 | 7/2005 | Miyazoe et al. | |
| 6,917,203 B1 | 7/2005 | Perotti et al. | |
| 6,923,207 B2 | 8/2005 | Misumi | |
| 7,182,102 B2 | 2/2007 | Kärcher | |
| 7,432,721 B2 | 10/2008 | Rober | |
| 7,516,656 B2 | 4/2009 | Nogami et al. | |
| 7,640,079 B2 | 12/2009 | Nickerson et al. | |
| 7,753,740 B2 | 7/2010 | Carolis et al. | |
| 7,890,216 B2 | 2/2011 | Boger et al. | |
| 7,903,383 B2 | 3/2011 | Fukano et al. | |
| 8,122,963 B2 | 2/2012 | Davis | |
| 8,219,253 B2 | 7/2012 | Arbter et al. | |
| 8,271,141 B2 * | 9/2012 | Cummings | G05B 23/0235 700/282 |
| 8,405,403 B2 | 3/2013 | Walker | |
| 8,689,833 B2 | 4/2014 | Berner et al. | |
| 8,812,914 B2 | 8/2014 | Jensen | |
| 9,022,069 B2 | 5/2015 | Neff et al. | |
| 9,128,008 B2 | 9/2015 | Tabor | |
| 9,410,639 B2 | 8/2016 | Fukano et al. | |
| 2002/0035414 A1 | 5/2002 | Morikawa et al. | |
| 2002/0092570 A1 | 7/2002 | Miyazoe et al. | |
| 2003/0226594 A1 | 12/2003 | Miyazoe et al. | |
| 2004/0051381 A1 | 3/2004 | Garner et al. | |
| 2005/0072954 A1 | 4/2005 | Nielsen | |
| 2007/0034264 A1 | 2/2007 | Kunz et al. | |
| 2008/0072657 A1 | 3/2008 | Herbert et al. | |
| 2009/0088874 A1 | 4/2009 | Arceo et al. | |
| 2009/0088906 A1 | 4/2009 | Minervini et al. | |
| 2010/0043894 A1 | 2/2010 | Moriya et al. | |
| 2010/0043896 A1 | 2/2010 | Shock et al. | |
| 2014/0174556 A1 | 6/2014 | Herbert et al. | |
| 2014/0299799 A1 | 10/2014 | Fukano et al. | |
| 2015/0083260 A1 | 3/2015 | Morikawa et al. | |
| 2015/0285281 A1 | 10/2015 | Gehrke et al. | |
| 2015/0378370 A1 | 12/2015 | Maichl et al. | |

FOREIGN PATENT DOCUMENTS

| | | |
|---|---|---|
| CN | 101410767 A | 4/2009 |
| CN | 102047349 A | 5/2013 |
| JP | 2002174358 A | 6/2002 |
| JP | 2007327606 A | 12/2007 |

OTHER PUBLICATIONS

Chinese Office Action in Chinese Patent Application No. 201580083682X dated Aug. 2, 2019 (7 pages).
Chinese Office Action in Chinese Patent Application No. 201780090447.4 dated Sep. 9, 2020 (6 pages).
Canadian Office Action, CA Application No. 3,057,060, Owner: Asco L.P., Title: A Device and Method for Anticipating Failure in a Solenoid Valve for a Manifold Assembly, dated May 11, 2022.
Extended European Search Report, Application No./Patent No. 17899476.0-1015/3592989 PCT/US2017021088, Applicant= Asco, L.P., dated Oct. 2, 2020.
Chinese Decision on Petition, Applicant No. 2017800904474, Applicant: Asco, L.P., Title: A Device and Method for Anticipating Failure in a Solenoid Valve for a Manifold Assembly, dated Oct. 9, 2021.
Brazilian Action, Application No. BR112019018713-8, Applicant: Asco, L.P., Title: A Device and Method for Anticipating Failure in a Solenoid Valve for a Manifold Assembly, dated Oct. 16, 2021.
Chinese Office Action, Application No. 2017800904474, Issue No. 2021033100988990, Applicant: Asco, L.P., dated Apr. 6, 2021.

* cited by examiner

VALVE DEVICE AND METHOD FOR ANTICIPATING FAILURE IN A SOLENOID VALVE ASSEMBLY IN A MANIFOLD ASSEMBLY

TECHNICAL FIELD

This invention relates to solenoid valve control systems in a manifold assembly.

BACKGROUND OF THE DISCLOSURE

Manifold assemblies are commonly used in an assembly or industrial line to selectively direct pneumatic pressure to various pneumatically operated devices in the line. The manifold assemblies incorporate electrically actuated solenoid valves that control the direction of pneumatic flow for operating these devices. These manifold assemblies are commonly modular and are assembled from a plurality of individual manifold block members, often referred to as manifold blocks, and individual control valve bodies, often referred to as solenoid valves, valve blocks or merely valve members. The manifold assembly often has a common pilot pressure passage and main pressure passage that are connected to the solenoid valves which in turn control the flow of main pressure to a respective pneumatically operated device.

These manifold assemblies have been known to incorporate sandwich blocks interposed between a manifold block and the solenoid actuated valve to provide shut off valves for the main pressure, to introduce a second pneumatic pressure source to a single valve station or to provide and isolate the exhaust of a single valve station from the manifold or to house pressure sensors. It is also known to install pressure sensors in sandwich blocks to monitor input and output pressures.

These manifold assemblies have the capacity to incorporate many manifold blocks, sandwich blocks, valve stations and solenoid valves which in turn operated many devices in a large manufacturing assembly or industrial line. As each of the control valves needs to be correctly operating to maintain correct operation of the respective device, failure of a single control valve and its respective device may cause an entire assembly or industrial line to cease operating. Hence it is highly desirous and advantageous to maintain each valve in operating condition and to replace any valve before its failure during scheduled maintenance and normal down time to prevent unscheduled cessation of the line.

This just-in-time replacement would be possible if failure of solenoid valve can be predicted. Prediction of failure is possible if failure is not sudden without warning. In other words, if anomalous behavior or early degradation of performance can be detected as an early warning indicator, then prediction of an imminent failure becomes possible.

U.S. Pat. No. 6,386,229 discusses a method to anticipate failure by monitoring position of the valve in the manifold block based on certain time values. The position of a spool is detected by the use of a magnet mounted on the spool valve and a Hall effect sensor protruding into the valve body for sensing the proximity of the magnet as the spool valve moves between its two end positions. The movement is timed and if the measured time slows down beyond normal operating values, the valve is then deemed to be in need of replacement. Often these timers, pressure sensors and Hall effect sensors are built into the valve body. This approach however requires the manifold block to be initially designed and constructed with the appropriate sensors and magnets and does not address the need to reduce modifications to the valve and unmet need to monitor the many control valves and manifold members that are already installed in automated industrial and assembly lines.

What is desired is a system to detect any degradation of the control valve by comparing pressure changes in the discharge lines relative to the supply lines compared to current flow that actuates the solenoid of the control valve. Further what is also desired is a sandwich block that mounts sensors that detect pressure, coil current and valve position that can be retrofitted with existing manifold blocks and control valve bodies and wherein the sensors can be used to anticipate failure of a control valve.

SUMMARY OF THE DISCLOSURE

According to one aspect of the invention, solenoid valve assembly includes a valve body in which a spool is slidably mounted and operated by a solenoid having a coil that operable causes the spool to move. A manifold member has a plurality of flow paths for supplying and discharging pressurized fluid to and from ports of the solenoid valve assembly. An intermediate block is interposed between the valve body and the manifold member with the intermediate block having a first mounting face on which the valve body is placed and a second mounting face opposite from the first mounting face for placing the intermediate block on the manifold member. The intermediate block has a plurality of through holes for connecting ports at the manifold member to ports at the valve body. At least one sensor is housed in the intermediate block for sensing at least one of pressure and flow in at least one of the through holes. Preferably, the at least one sensor is in the form of a sensor board and has a plurality of pressure transducers mounted thereon for detecting pressure in a plurality of the through holes. Preferably, the at least one sensor also includes a current sensor housed in the intermediate block for sensing current supplied to the coil. In one embodiment, a position sensor is inside the intermediate block without intruding into the valve body for sensing a position of a magnet affixed to the spool. In one embodiment, there is a leakage sensor that detects ultrasound caused by leaks in one of the flow paths.

According to another aspect of the invention, a solenoid valve assembly has a valve body in which a spool is slideably mounted and operated by a solenoid having a coil that operable causes the spool to move. A manifold member has a plurality of flow paths for supplying and discharging pressurized fluid to and from ports of the solenoid valve assembly. The solenoid valve assembly has at least one sensor for detecting a plurality of parameters of the solenoid valve assembly. One parameter may be pressure in the discharge port and another parameter may be current to the coil for comparing current with pressure during at least one actuation cycle of the solenoid valve assembly to establish a normalized cycle profile. A storage device stores the normalized cycle profile detected by the sensors and also stores a predetermined tolerance boundary determined from the normalized cycle profile. A comparator is connected to the at least one sensor and storage device and compares parameters from the at least one sensor with the normalized cycle profile and the predetermined tolerance boundary. An alarm is operable connected to the comparator and actuates if the comparator compares a parameter from the at least one sensor with normalized profile and the predetermined tolerance boundary and finds the parameter outside of the predetermined tolerance boundary.

Preferably the at least one sensor is housed in an intermediate block disposed between the valve body and the manifold member. The intermediate block has a first mounting face on which the valve body is placed and has a second mounting face opposite from the first mounting face for placing the intermediate block on the manifold member. A plurality of through holes operably connect ports at the manifold member to ports on the valve body. The at least one sensor is housed in the intermediate block for sensing at least one of pressure and flow in at least one of the through holes. In one embodiment, the at least one sensor is in the form of a sensor board mounts a plurality of pressure transducers thereon for detecting pressure in a plurality of the through holes. Preferably, one of the parameters is the position of the spool within the valve body.

According to another aspect of the invention, a detection system for a solenoid valve assembly has at least one sensor for detecting pressure in at least one discharge ports of the solenoid valve assembly and for detecting current supplied to the coil of the solenoid valve assembly for comparing current with pressure in the ports to establish a normalized cycle profile during at least one actuation cycle of the solenoid valve assembly. A storage device operably connects to the at least one sensor to receive the sensed parameter to determine the normalized cycle profile and storing a predetermined tolerance boundary established from the normalized cycle profile. A comparator is operably connected to the storage device and the at least one sensor for comparing parameters from the at least one sensor to the normalized cycle profile and the predetermined tolerance boundary. An alarm device is operably connected to the comparator and is actuated if the comparator compares a parameter from the at least one sensor with the normalized profile and predetermined tolerance boundary and finds the parameter outside of the predetermined tolerance boundary.

According to another aspect of the invention, an intermediate block is constructed to be interposed between a manifold block and a control valve body housing a solenoid operated control valve. The intermediate block has a set of through holes for connecting ports in the manifold block with ports in the control valve body. The intermediate block has a conductive circuit line to provide current to and from a power circuit line in the manifold block and to and from a coil of the solenoid in the control valve. A plurality of sensors are mounted therein for sensing pressure in at least one of the through holes and current in the conductive circuit line preferably, one of the sensors is constructed for sensing a position of the control valve in the control valve body.

According to another aspect of the invention, a method of determining the operating condition of a solenoid operated fluid valve includes actuating the solenoid operating fluid valve for at least one cycle. At least two parameters are measured after actuation of the solenoid operating fluid valve for the at least one cycle to establish a normalized operating profile of the solenoid operating fluid valve. A tolerance boundary is established based on the normalized operating profile. The normalized operating profile and the tolerance boundary are stored in a memory device. At least two parameters are sensed and measured during normal operation of the solenoid operating valve. The measured two parameters are compared in a comparator to the normalized operating profile and the tolerance boundary in the memory device. An alarm is actuated if the measured parameter is outside of the tolerance boundary.

BRIEF DESCRIPTION OF THE DRAWINGS

Reference now is made to the accompanying drawings in which.

DETAILED DESCRIPTION OF THE PREFERRED EMBODIMENT

Figure 1:
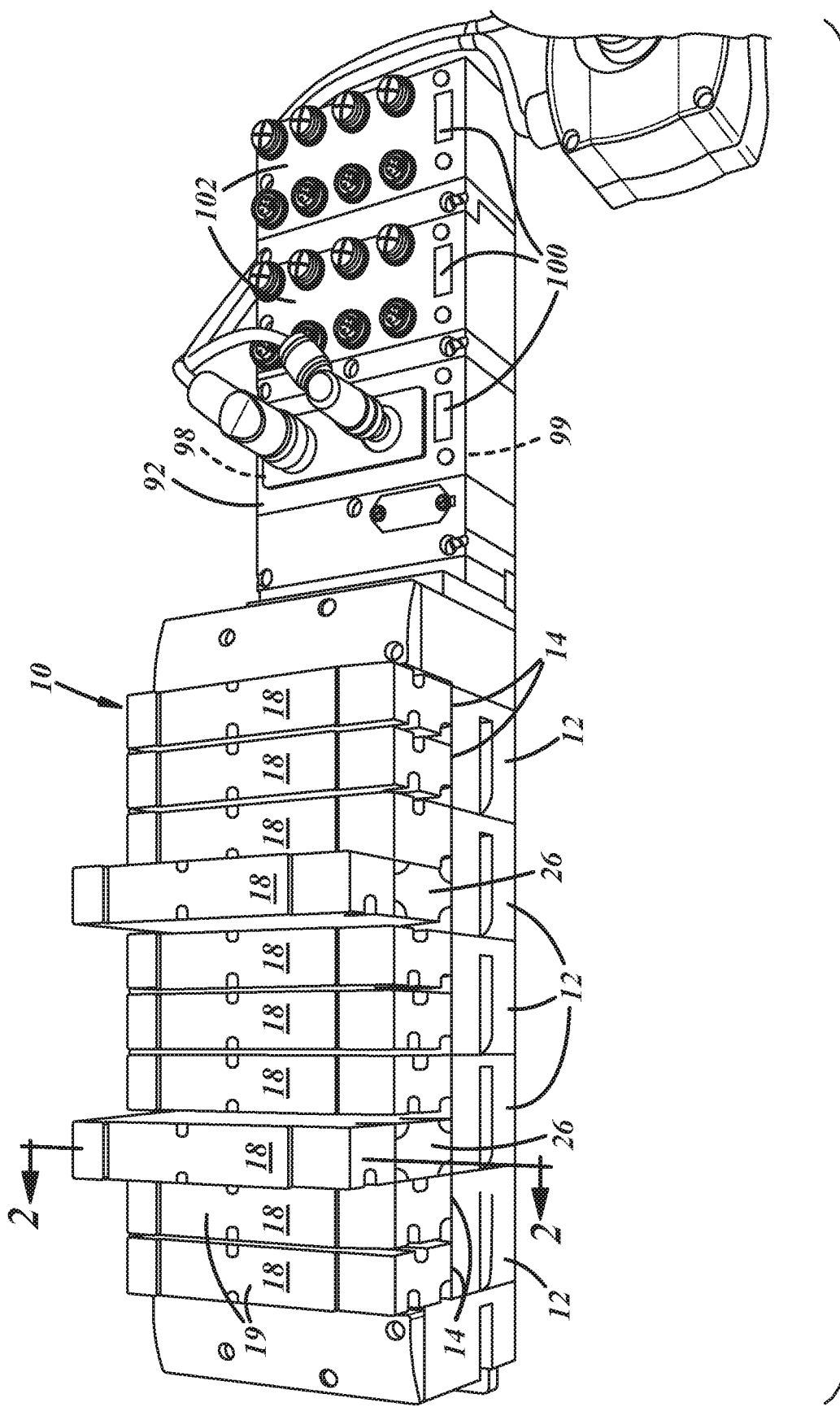
FIG. 1 is a perspective and partially schematic overview of one embodiment according to the invention.
Figure 2:
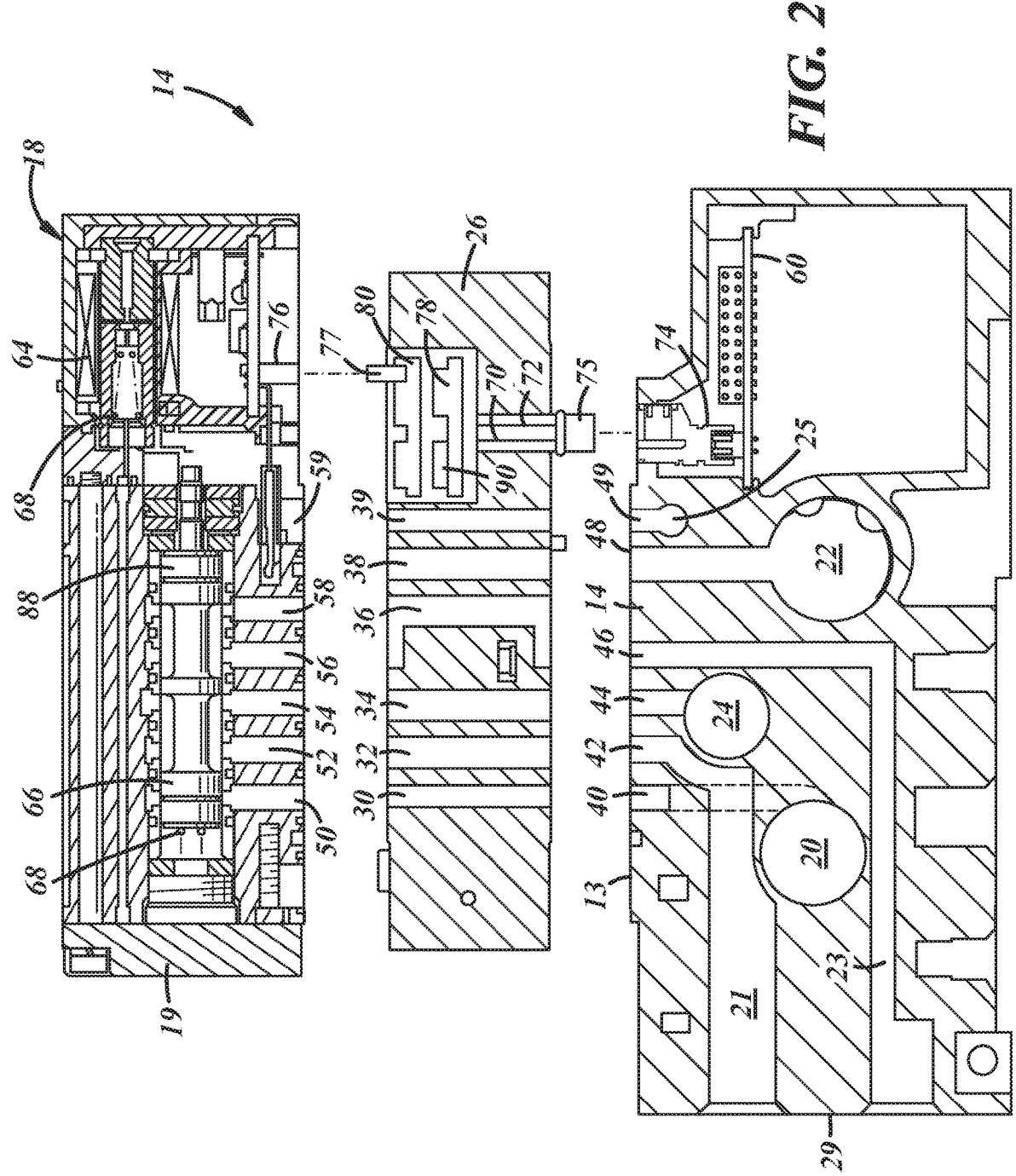
FIG. 2 is an exploded cross sectional view taken along 2-2 shown in FIG. 1.
Figure 3:
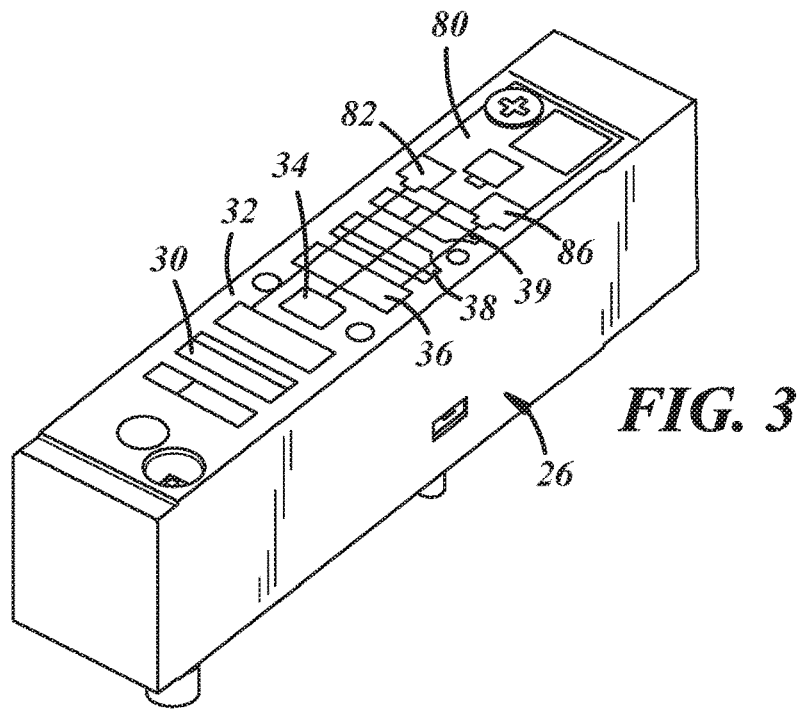
FIG. 3 is an enlarged perspective view of a sandwich block shown in FIG. 1.
Figure 4:
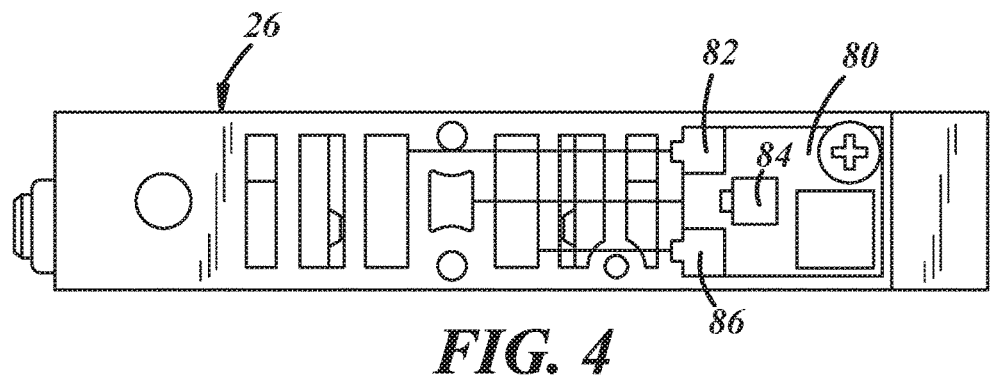
FIG. 4 is a top plan view of the sandwich block shown in FIG. 3.
Figure 5:
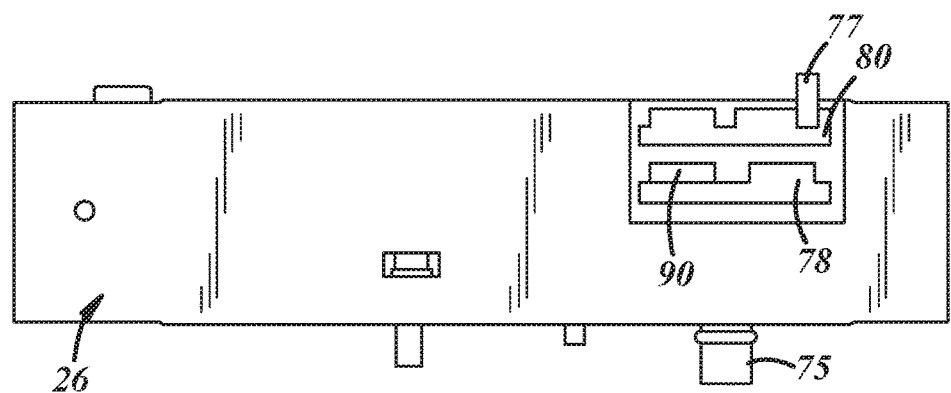
FIG. 5 is an enlarged side elevational view of the sandwich block illustrating the position of the pressure board and current board installed therein.

Referring now to FIGS. 1 and 2, a fluid control system 10 is modular in nature and has a plurality of valve manifold blocks 12 interconnected together. The particular number of blocks 12 is dependent on the application and the capacity of a circuit board 60 installed in each manifold block 12. Each manifold block 12 may have two valve stations 14 for mounting two control valves 18. Each control valve 18 may have an outer body 19. A pair of control valve bodies 19 may be mounted directly on the upper surface 13 of the manifold block 12. While a manifold block 12 is illustrated with two valve stations, it is foreseen that a manifold block with a single valve section can also be used.

As shown in FIG. 2, each manifold block 12 has fluid supply and fluid exhaust passages 20, 22, and 24 that extend laterally through the block to be in communication with an adjacent block 12. Each manifold block also has discharge passages 21 and 23 that extend to an outer wall 29 for connecting to a pneumatically operated device (not shown). Each manifold block also has a transverse pilot pressure passage 25. Each passage 20, 21, 22, 23, 24, and 25 connects to a respective port 40, 42, 44, 46, 48 and 49 at the upper surface 13 of the manifold block.

An intermediate block 26 often referred to as a sandwich block is interposed between at least one control valve body 19 and one manifold block 12. As shown in FIG. 2, the intermediate block 26 has a plurality of through holes 30, 32, 34, 36, 38 and 39 that connect the supply, discharge pilot and exhaust ports 40, 42, 44, 46, 48 and 49 of the manifold block to the supply, discharge pilot and exhaust ports 50, 52, 54, 56, 58 and 59 of the control valve 18.

The circuit board 60 supplies electric power to the solenoid valve coil 64 of the control valve for actuating the solenoid valve and moving its spool 66. In a well known fashion, the spool may be biased to one direction by a spring 68 and is movable in the opposite direction by application of fluid pressure to the opposite end of the spool. Although the embodiment shown is a single solenoid valve assembly, it will be understood that commercially available dual solenoid valve assemblies may also be used.

The circuit board 60 besides having electrical power traces may also have a single communication line for serial connection to each control valve 18. Such a single line is described in more detail in U.S. Ser. No. 14/765,019 filed on Jul. 31, 2015 and is incorporated herein by reference. The power traces and single communication line is generally attached to pin connector 74.

Besides the through holes 30-39, the intermediate block also has power line 70 passing through for connecting pin connector 74 on circuit board 60 to the pin connector 76 in the valve body such that the solenoid coil 64 is powered by power line 70. Appropriate pin connectors 75 and 77 are at the top and bottom faces of the intermediate block 26 for operable connection to the respective pin connectors 74 and 76 to provide continuity of power line 70 from pin connector 74 to pin connector 76.

A communication line 72 also extends from circuit board 60 and up through intermediate block 26 connected to a current sensor board 78 and a pressure sensor board 80 mounted in the intermediate block. The communication line can be incorporated in pin connectors 74 and 75. The current sensor board is also connected to the current power line 70. The pressure sensor board 80 has three pressure transducers 82, 84, 86 connected to discharge through holes and supply through holes 32, 34 and 36 for sensing pressure therein.

An optional position sensor magnet 88 may be connected to the spool and sensed by a position sensor 90 for example a Hall effect sensor also mounted on current sensor board 78.

The parameter data such as pressure, flow, electrical current, and response time is sent via the communication line 72 to a local or remote microcontroller such as one installed in communication module 92 which houses memory storage 98 and a comparator 99.

Figure 7:
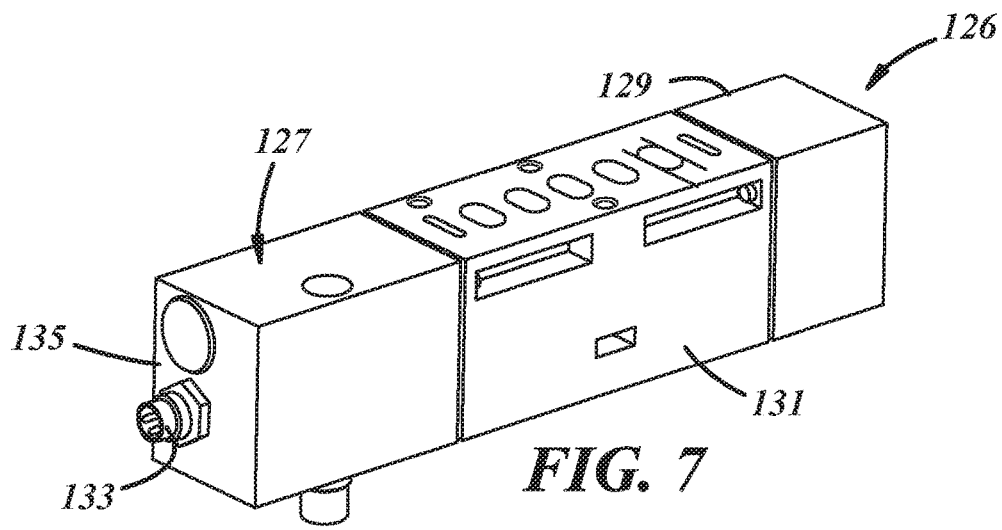
FIG. 7 is a perspective view of a second embodiment of a sandwich block according to the invention.
Figure 8:
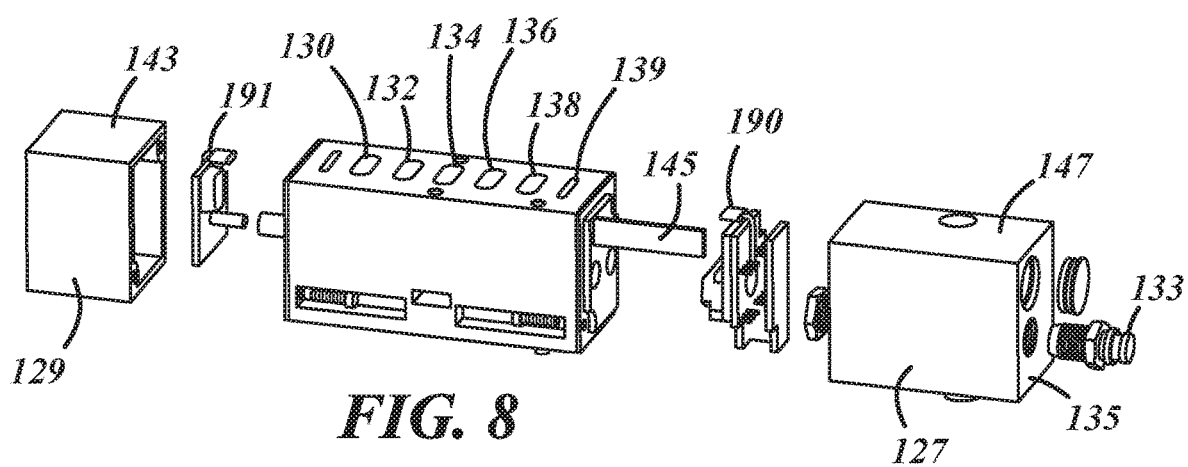
FIG. 8 is an exploded perspective view of the sandwich block shown in FIG. 7.

Referring now to FIGS. 7 and 8, a second embodiment of a sandwich or intermediate block 126 is shown. It generally has two end caps 127 and 129 and a mid section 131. End cap 127 has a pin connector 133 extending out an end 135 for providing power for one or two Hall effect sensors and for a signal communication pin. Each end cap 127 and 129 is made from a non magnetic material such as plastic or aluminum and houses Hall effect sensor 190 and optional second Hall effect sensor 191 in proximity to upper walls 147 and 143. Second Hall sensor 191 is in electrical communication via a cable strap 145 that extends through mid section 131.

The mid section has the through holes 130, 132, 134, 136, 138 and 139 and similarly houses the other sensors as described for the first embodiment such as the pressure or flow, or additional sensors for sensing other parameters for example vibration or leakage sensors.

Figure 6:
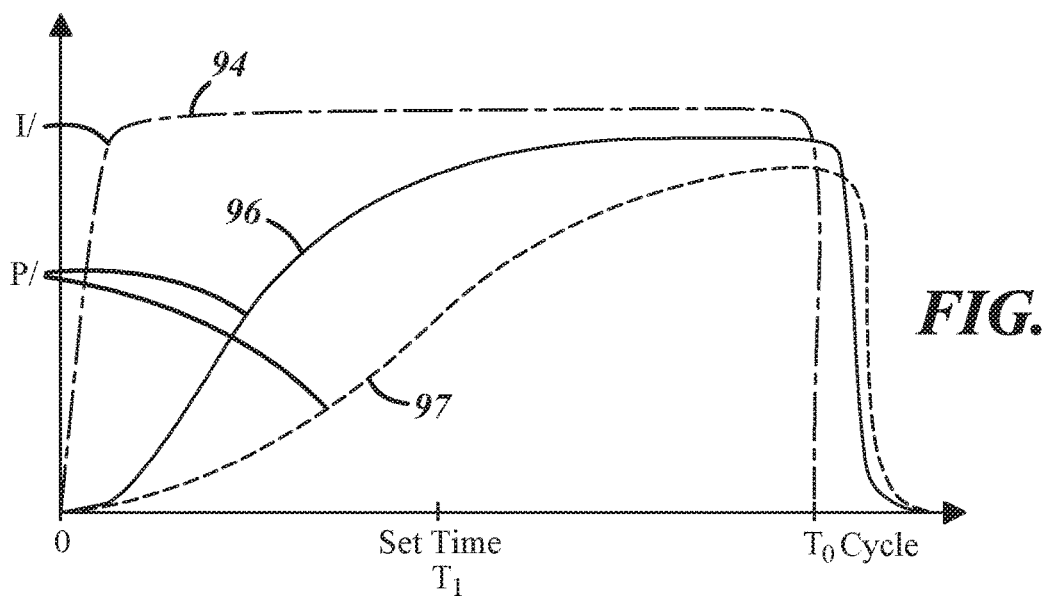
FIG. 6 is a diagram showing an example of an established profile showing current draw to a pressure buildup for an actuation cycle of the control valve and a then established tolerance boundary of current and pressure build up during a cycle.

A schematic example of a normalized cycle is shown in FIG. 6. The normalized cycle for current being turned on and off is shown by dotted and dash curve 94 for a cycle time $T_o$. The pressure is measured in the discharge line for a given pressure in the supply lines. The measured pressure values are shown as a solid curve 96 which can be stored in memory storage 98. A tolerance band or limit can then be established as shown by broken curve 97 in memory storage 98 bases on certain degradation from line 96 for which the valve is not moving quickly enough and the buildup of pressure lags. A comparator 99 can compare a measured parameter to the normalized profile and the respective tolerance band limit for a particular time Ti. Once the degradation goes below i.e outside the tolerance limit, an alarm may be sent by the communication module 92 to the operator, for example via a light indicator 100 in the communication module 92 or to a light indicator 100 in the communication module 92 in a corresponding I/O unit 102 corresponding to the particular control valve indicating which control valve is below the preset tolerance limit. Other parameters may be substituted such as spool motion or flow rate in place of or in addition to pressure and time. The choice of parameters may be selected depending on the specific application of the control valve.

Figure 9:
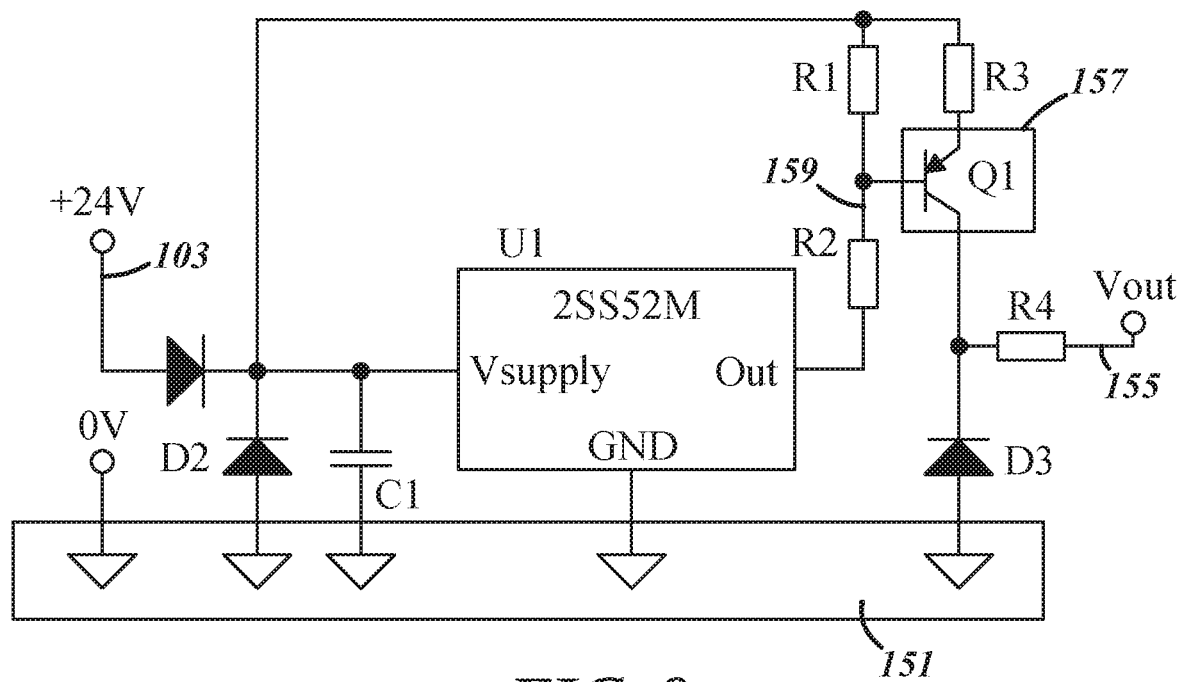
FIG. 9 is a schematic view of the electric circuit for producing a position indication signal.

The electronic schematic of the Hall effect sensor is disclosed in FIG. 9. The power connector has a ground volt pin 151, power voltage pin connector 103, and output signal connector 155. The Hall effect sensor 190 receives voltage from pin 103. Voltage also goes through resister R3 to transistor 157. When the Hall effect sensor 190 senses a sufficient magnetic field strength from the magnet 88 on spool, it actuates to pass voltage to line 159 through resistor R2 which turns on transistor 157 and allows voltage out through line 155 to indicate the position of the spool.

At the time when a control valve shows some degradation before a complete failure, indication of this degradation can be in the form of an alarm or visual notification which allows the control valve to be repaired or replaced at the next down time or scheduled maintenance before complete failure occurs which can then avoid unscheduled and unnecessary line stoppage.

By having the pressure sensors, current sensors, and other parameter sensors being installed in the intermediate block, one can retrofit a standard existing control valve 18 with the intermediate block 26 interposed between the manifold block 12 and the control valve body with no further modification to the control valve body 19 or manifold block 12. One or a plurality of intermediate blocks 26 may be added later as an accessory to the valve manifold 10 at any or all of the control valve stations.

It is also foreseen that the information may be transmitted to the controller by wireless technology.

Other variations and modifications are possible without departing from the scope and spirit of the present invention as defined by the appended claims.

The embodiments in which an exclusive property or privilege is claimed are defined as follows:

1. A solenoid valve assembly with a detection system, comprising:

an intermediate block (26) being interposed between a manifold block (12) and a control valve body (19) housing a control valve (18) with a solenoid comprising a coil (64) for actuating said control valve (18) for controlling flow or pneumatic fluid;

said intermediate block (26) having a set of through holes (30, 32, 34, 36, 38, 39) for connecting ports (40, 42, 44, 46, 48, 49) in said manifold block (12) with ports (50, 52, 54, 56, 58, 59) in said control valve body (19);

a conductive circuit line (70) for providing current to and from a power circuit line in said manifold block (12) and to and from said coil (64) of said solenoid of said control valve (18); and first and second sensors (78, 80) that can be used to detect failure of said control valve (18);

characterized in that said first sensor (78) is capable of detecting current supplied to said coil (64) of said solenoid valve assembly by sensing current in said conductive circuit line (70), whereas said second sensor (80) is capable of detecting another parameter in supply and discharge ports (52, 54, 56) of said solenoid valve assembly by sensing said another parameter in at least one of said through holes (30, 32, 34, 36, 38, 39);

wherein a storage device (98) is operably connected to said sensors (78, 80) to receive parameter data for comparing current with said another parameter in said supply and discharge ports (52, 54, 56) to establish a normalized cycle profile during at least one cycle of said solenoid valve assembly to establish said normalized cycle profile and storing a predetermined tolerance boundary determined from said normalized cycle profile;

wherein a comparator (99) is operably connected to the storage device (98) and said sensors (78, 80) for comparing parameters from said sensors (78, 80) to said normalized cycle profile and said predetermined tolerance boundary; and wherein an alarm device (100) is operably connected to said comparator (99), which is actuated if said comparator (99) compares a parameter from said at least one sensor (78, 80) with the normalized cycle profile and the predetermined tolerance boundary and finds the parameter is outside of said predetermined tolerance boundary; wherein said second sensor (80) is housed in said intermediate block (26; 126) for sensing pneumatic pressure in at least one of said through holes (30, 32, 34, 36, 38, 39); and wherein said first sensor (78) and second sensor (80) are housed in a cavity in said intermediate block (26).

2. A solenoid valve assembly as defined in claim 1, characterized in that:

a spool (66) is slidably mounted in said control valve body (19) and operated by said solenoid having said coil (64) that operably causes the spool (66) to move;

said manifold (12) having plurality of flow paths (20, 21, 22, 23, 24) for supplying and discharging pressurized pneumatic fluid to and from said ports of the solenoid valve assembly; and wherein said second sensor (80) is in the form of a sensor board mounted in said intermediate block (26; 126) and mounting a plurality of pressure transducers 982, 84, 86) thereon for detecting pneumatic pressure in a plurality of said through holes (30, 32, 34, 36, 38, 39).

3. A solenoid valve assembly as according to claim 2 characterized by a position sensor (90) constructed for sensing a position of said spool (66) of said solenoid valve assembly during said at least one cycle and when said comparator (99) compares said normalized cycle profile and said predetermined tolerance boundary.

4. A solenoid valve assembly according to claim 3, characterized in that said position sensor (90) is positioned inside the intermediate block (26) without intruding into said control valve body (19) for sensing the position of a magnet (88) affixed onto said spool (66).

5. A solenoid valve assembly according to claim 2, characterized by:

a position sensor (190, 191) constructed for sensing a position of said control valve (18) in said control valve body (19);

said intermediate block (126) having a mid-section member (131) having said set of through holes (130, 132, 134, 136, 138, 139); and a pair of end-sections (127, 129) made from non-magnetic material and attached to said mid-section member (131);

wherein at least one of said end-sections (127, 129) has an interior with said position sensor (190, 191) mounted under and upper wall (143, 147) of said end-section (127, 129) within said interior.

6. A solenoid valve assembly according to claim 2, characterized in that said position sensor (90) is positioned inside the intermediate block (26) without intruding into said control valve body (19) for sensing the position of a magnet (88) affixed onto said spool (66).

7. A solenoid valve assembly according to claim 1, characterized in that said second sensor for detecting anther parameter is a pneumatic pressure sensor (80).

8. A solenoid valve assembly according to claim 7 characterized by a leakage sensor that detects ultrasonic vibrations caused by leaks in at least one of the flow paths.

9. A solenoid valve assembly according to claim 1, characterized by a position sensor (90) constructed for sensing a position of said control valve (18) in said control valve body (19).

10. A solenoid valve assembly according to claim 1 characterized by a leakage sensor that detects ultrasonic vibrations caused by leaks in at least one of the flow paths.

* * * * *